(12) United States Patent  
Schuette et al.

(10) Patent No.: US 9,081,665 B2  
(45) Date of Patent: Jul. 14, 2015

(54) APPARATUS, METHODS AND ARCHITECTURE TO INCREASE WRITE PERFORMANCE AND ENDURANCE OF NON-VOLATILE SOLID STATE MEMORY COMPONENTS

(71) Applicant: OCZ Technology Group Inc., San Jose, CA (US)

(72) Inventors: Franz Michael Schuette, Colorado Springs, CO (US); Yaron Klein, Raanana (IL); Hyun Mo Chung, San Jose, CA (US)

(73) Assignee: OCZ Storage Solutions Inc., San Jose, CA (US)

( * ) Notice: Subject to any disclaimer, the term of this patent is extended or adjusted under 35 U.S.C. 154(b) by 217 days.

(21) Appl. No.: 13/758,346

(22) Filed: Feb. 4, 2013

(65) Prior Publication Data

US 2013/0205076 A1 Aug. 8, 2013

Related U.S. Application Data

(60) Provisional application No. 61/594,076, filed on Feb. 2, 2012.

(51) Int. Cl.
```
G06F 12/00    (2006.01)
G11C 16/10    (2006.01)
G06F 12/02    (2006.01)
G06F 12/08    (2006.01)
G06F 12/12    (2006.01)
```
(52) U.S. Cl.
CPC ........ *G06F 12/0246* (2013.01); *G06F 12/0871* (2013.01); *G06F 12/122* (2013.01); *G06F 2212/214* (2013.01); *G06F 2212/222* (2013.01); *G06F 2212/225* (2013.01)

(58) Field of Classification Search
None
See application file for complete search history.

(56) References Cited

U.S. PATENT DOCUMENTS

| 4,699,239 | A  | * | 10/1987 | Ishino et al. | 701/51 |
| 8,261,133 | B1 | * | 9/2012 | Ali-Santosa et al. | 714/54 |
| 2004/0088475 | A1 | * | 5/2004 | Streif et al. | 711/105 |
| 2005/0251618 | A1 | * | 11/2005 | Nonaka et al. | 711/103 |

(Continued)

OTHER PUBLICATIONS

Park et al. Short-Random Request Absorbing Structure with Volatile DRAM Buffer and Nonvolatile NAND Flash Memory. Proceedings of the 3rd WSEAS International Conference on Computer Engineering and Applications (CEA'09), pp. 257-262. 2009.*

(Continued)

*Primary Examiner* — Daniel Bernard
(74) *Attorney, Agent, or Firm* — Hartman Global IP Law; Gary M. Hartman; Michael D. Winter

(57) ABSTRACT

A solid-state mass storage device for use with host computer systems, and methods of increasing the endurance of non-volatile memory components thereof that define a first non-volatile memory space. The mass storage device further has a second non-volatile memory space containing at least one non-volatile memory component having a higher write endurance than the memory components of the first non-volatile memory space. The second non-volatile memory space functions as a low-pass filter for host writes to the first non-volatile memory space to minimize read accesses to the first non-volatile memory space. Contents of the second non-volatile memory space are managed using a change counter.

32 Claims, 6 Drawing Sheets

(56) References Cited

U.S. PATENT DOCUMENTS

| | | | |
|---|---|---|---|
| 2006/0233077 A1* | 10/2006 | Yu | 369/53.11 |
| 2008/0307152 A1* | 12/2008 | Nakanishi et al. | 711/102 |
| 2009/0055575 A1* | 2/2009 | Hanhimaki et al. | 711/103 |
| 2010/0030999 A1* | 2/2010 | Hinz | 711/206 |
| 2010/0082890 A1* | 4/2010 | Heo et al. | 711/103 |
| 2010/0115175 A9* | 5/2010 | Zhuang et al. | 711/103 |
| 2011/0066788 A1* | 3/2011 | Eleftheriou et al. | 711/103 |
| 2011/0283066 A1* | 11/2011 | Kurashige | 711/135 |
| 2012/0117304 A1* | 5/2012 | Worthington et al. | 711/103 |
| 2012/0232744 A1* | 9/2012 | Vilar et al. | 711/103 |
| 2013/0024744 A1* | 1/2013 | Takizawa | 714/763 |
| 2013/0049864 A1* | 2/2013 | Ikehata et al. | 330/253 |
| 2013/0198434 A1* | 8/2013 | Mylly et al. | 711/103 |

OTHER PUBLICATIONS

Fujitsu Semiconductor America, Inc. Fact Sheet FRAM-FS-21402-6/2011. FRAM Standalone Memory Products: Non-Volatile Ferroelectric Random-Access Memory (FRAM). 2011.*

* cited by examiner

APPARATUS, METHODS AND ARCHITECTURE TO INCREASE WRITE PERFORMANCE AND ENDURANCE OF NON-VOLATILE SOLID STATE MEMORY COMPONENTS

CROSS REFERENCE TO RELATED APPLICATIONS

This application claims the benefit of U.S. Provisional Application No. 61/594,076, filed Feb. 2, 2012, the contents of which are incorporated herein by reference.

BACKGROUND OF THE INVENTION

The present invention generally relates to non-volatile (permanent) memory-based mass storage devices suitable for use with computers and other processing apparatuses. More particularly, this invention relates to mass storage devices that use combinations of non-volatile solid-state memory components to promote the performance and endurance of the storage device.

Mass storage devices such as advanced technology attachment (ATA) drives and small computer system interface (SCSI) drives are rapidly adopting non-volatile solid-state memory technology, such as flash memory or another emerging solid-state memory technology, non-limiting examples of which include phase change memory (PCM), resistive random access memory (RRAM), magnetoresistive random access memory (MRAM), ferromagnetic random access memory (FRAM), organic memories, or nanotechnology-based storage media such as carbon nanofiber/nanotube-based substrates. Currently the most common solid-state technology uses NAND flash memory components (integrated circuits, or ICs) as inexpensive storage memory, often in a form commonly referred to as a solid-state drive (SSD).

Briefly, flash memory components store information in an array of floating-gate transistors (FGTs), referred to as cells. The cell of a NAND flash memory component has a top gate (TG) connected to a word (or control) line and juxtaposed to a floating gate (FG), the latter being sandwiched between the top gate and the channel of the cell. The floating gate is separated from the channel by a layer of tunnel oxide. Data are stored in (written to) a NAND flash cell in the form of a charge on the floating gate which, in turn, defines the channel properties of the NAND flash cell by either augmenting or opposing a charge on the top gate.

Data are erased from a NAND flash cell by applying an erase voltage to the device substrate, which then pulls electrons from the floating gate over an extended period of time. Charging (programming) of the floating gate is done by applying short pulses of a high positive voltage (typically 18-20V) to the word line that is connected to the top (programming) gate. The resulting electrical field draws electrons from the substrate through the tunnel oxide layer into the floating gate until the desired level of charge of the floating gate is achieved and verified by a subsequent read of the cell's bit value. The physics behind both programming and erasing are referred to as Fowler Nordheim quantum-mechanical tunneling, as well as injection of electrons into the floating gate.

From the above description it should be clear that the programming can only change the charge of any given floating gate from a fully erased state towards a fully programmed state, which is often described as the unidirectional programmability of NAND flash cells. That is, any NAND flash cell will have a fully erased state that, by convention, is equivalent to a "1" value of the stored bit and it is possible to program the cell thereafter to a "0" bit value but not vice versa. In multi-level cell (MLC) NAND flash memory components, more than two levels of charge are injected into the FG, allowing n bits per cell as long as $2^n$ charge levels of the floating gate can be reliably resolved within a predetermined range of possible control voltages applied to the control gates to turn the gate ON. Similar to single-level cell (SLC) NAND flash memory, naming practices have been adopted for identifying the erased and programmed states of an MLC NAND flash memory cell. As an example, in the case of an MLC flash memory having four different levels to encode two bits per cell, possible bit values are "11" (fully erased), "10" (partially programmed), "01" (partially programmed), and "00" (fully programmed). However, as mentioned above, programming can only shift cells to a lower value, and programming in the opposite direction is not possible.

On a higher level, NAND flash cells are organized in the form of pages. Specifically, NAND flash memory components typically use thirty-two serially connected FGTs as the smallest unit where each FGT defines a memory cell. Several of these daisy chains form a page wherein the number of chains is always a power of two. NAND flash memory pages, in turn, are combined into memory blocks. Each block is a predetermined section of the NAND flash memory component. A NAND flash memory component allows data to be stored and retrieved on a page by page basis, in some cases even on a fraction of a page called sub-page. These may be referred to as the smallest functional or writable unit of the memory component. However, the use of sub-page programming typically results in a severe performance hit and is not commonly used in high performance devices. On the contrary, a common practice is to write two pages simultaneously of two different dies stacked to constitute an upper and lower plane. As a result, the physical page size is effectively doubled, which means that each access will read or write twice the number of data from or to the flash array. At the same time also the minimum amount of data that have to be written in a single sweep is doubled, for example in the case of a physical 8 kB flash page size, the accessible page size will be 16 kB.

Erasing NAND flash memory can only be done on a block-by-block basis. For example, erasing cells is done by connecting all FGT daisy chains within a block via a select transistor to an erase voltage of typically +20 V while connecting the other end of the chains via a second select transistor to ground. A simplified description of this process would be the application of a positive voltage to the device substrate on a per block basis. Since all pages are a serial daisy chain of FGTs, the erase current flows through all FGTs and consequently, the erase process does not allow isolation of individual cells. Moreover, for the purpose of simplicity of the design, NAND flash memory ties all pages within a block to a common erase switch, therefore, erasing of NAND flash memory cells can only be done on a per block basis. As a result, the minimum erasable size is an entire block, and, therefore every time a cell is being re-written, the entire block needs to be erased.

Over time, NAND flash memory cells wear out. Fowler-Nordheim tunneling, which is responsible for injecting electrons into the floating gate by drawing them from the substrate and through the tunnel oxide layer during programming as well as the reverse process of drawing the electrons from the floating gate back through the tunnel oxide layer and into the substrate during erasing, is extremely harsh on the tunnel oxide layer. The electrical fields that are applied are on the order of 10 million V/cm which can cause breaking of atomic bonds in the oxide layer, and consequent trapping of electrons at the broken atomic bond sites. An exacerbating factor in this context is the problem that the tunnel oxide layer becomes thinner and, by extension, more fragile with every migration to a new and smaller manufacturing process node. As a consequence, write endurance that used to be 10,000 program/erase (P/E) cycles at a 65 nm process geometry has decreased to about 3000 to 5000 P/E cycles at 30 nm process node and continues to decline towards roughly 1000 P/E cycles at 2× nm process nodes. Limited life span and endurance of NAND flash memory are becoming extremely critical factors in any considerations of NAND flash-based storage media.

As used herein, the endurance of a memory component refers to the endurance of its memory cells, which is typically quantified as the number of program/erase cycles a cell can be subjected to before it becomes unreliable. Accordingly, the remaining endurance of a NAND flash memory component depends on the endurance of its NAND memory cells. The endurance of a particular NAND cell is dependent on the number of P/E cycles that the cell has been subjected to. In addition, the level of programming plays an important role for the stress that a given cell has been exposed to. If cells are programmed to a higher level, that means that more electrons have passed through the oxide layer. In contrast, if cells are programmed merely to a "1" level, that means that they stay at the fully erased level and no electrons are drawn through the oxide layer, nor are electrons drawn "back" through the oxide layer on the next erase cycle. It should be apparent that this level of programming has less adverse effects on the tunnel oxide layer than a fully programmed level and subsequent erase.

Lastly, the frequency of program/erase cycles has a pronounced impact on the overall endurance of a NAND flash memory component since the oxide layer is "self-healing." That is, after a given amount of time, the above mentioned broken atomic bonds that trap electronic charges re-anneal, thereby releasing the trapped electrons and rejuvenating the oxide layer in a somewhat temperature-dependent manner. Consequently, relative to this issue is whether the data of NAND flash cells have been recently accessed and/or are subjected to a high frequency of updates (referred to herein as "hot" or "fresh") or whether the last access of the data dates back far enough and/or updates occur at a sufficiently lower frequency to allow the data to be considered as old (referred to herein as "cold" or having "cooled off").

In view of the inherent endurance limitations of NAND flash memory that cannot be further improved by internal management of write accesses, for example, wear leveling, it is desirable to find ways to reduce the overall number of program/erase cycles a memory cell is subjected to. Further, it is desirable to reduce the program/erase frequency of any given NAND flash memory cell in order to allow recovery of the tunnel oxide layer and accordingly increase the endurance of the NAND flash memory component as a whole.

BRIEF DESCRIPTION OF THE INVENTION

The present invention provides solid-state mass storage devices adapted for use with host computer systems, and methods of increasing the endurance of non-volatile memory components of the storage device as well as the overall performance of the storage device.

According to a first aspect of the invention, a mass storage device having a host interface and memory controller further includes at least a first non-volatile memory space defined by at least a first non-volatile memory component organized into blocks and pages, and a second non-volatile memory space defined by a second non-volatile memory component that has a higher-endurance non-volatile memory component as compared to the first non-volatile memory component, and has a capacity to store data corresponding to at least a plurality of the memory blocks of the first non-volatile memory component. The second non-volatile memory component is configured into zones wherein each zone has a capacity of a plurality of the pages of the first non-volatile memory component. The second non-volatile memory space is configured to receive data written by the host computer system to the mass storage device, and the data are stored within the zones of the second non-volatile memory space.

According to a particular aspect of the invention, the mass storage device described above further has a change counter that determines a change frequency of the data stored within the zones of the second non-volatile memory space to identify lower and higher change frequency data, wherein the lower change frequency data are committed to first non-volatile memory space, and the higher frequency data are maintained in the second non-volatile memory space.

With the configuration described above, the second non-volatile memory space can serve as write and read cache for the mass storage device. The second non-volatile memory space can interface with a management unit that governs the commitment of cold data (data with a low update frequency) to the first non-volatile memory space based on the change counter.

A second aspect of the current invention is a method for increasing the write endurance of a flash-based solid-state mass storage device operating with a host computer system. The method includes providing a first non-volatile memory space comprising flash memory components organized into logical pages and logical blocks, writing all data written by the host computer system to the mass storage device in a low pass filter comprising a second non-volatile memory space, dividing a first address space of the second non-volatile memory space into zones of predetermined size, monitoring recurrent writes of the data stored in the zones at a logical block address with a change counter, generating with the change counter change indices that are individually associated with each of the zones wherein the change index of any one of the zones increases upon modification of the data within the zone and decreases if the data within the zone are not changed, and then maintaining data with a higher change index in the second non-volatile memory space and committing data with a lower change index to the first non-volatile memory space.

According to optional aspects of the invention, the mass storage devices and/or methods described above can further make use of a volatile memory space that can be accessed by reads to the host computer system. Data written by the host computer system to the mass storage device are stored in the second non-volatile memory space and the volatile memory space in a coherent manner so that if any data in the second non-volatile memory space are updated or modified, the data in the volatile memory space are modified accordingly. In a variation of this aspect, the second non-volatile memory space can be defined as an extension of the volatile memory space and data written to the second non-volatile memory space are not shadowed into the volatile memory space.

As another optional aspect, all host writes and reads to the mass storage device can be written to and read from the volatile memory space, and all data written by the host computer system to the mass storage device can be shadowed by the second non-volatile memory space. Commitment of data from the volatile memory space to the first non-volatile memory space can be governed by the change counter tracking the changes of data written by the host computer system to the mass storage device. Depending on the particular embodiment, the change counter can monitor zones within the volatile memory space and the second non-volatile memory space wherein the zones in their corresponding memory components have an identical organization.

A third aspect of the current invention is a low-pass filter for reducing host writes by a host computer system to first non-volatile memory components that define a first non-volatile memory space of a solid-state mass storage device. The low-pass filter includes a second non-volatile memory space defined by at least a second non-volatile memory component that has a higher endurance compared to the first non-volatile memory components. The second non-volatile memory space is adapted as a write cache for the first non-volatile memory space and is configured into zones. A change counter monitors changes of data stored in each of the zones of the second non-volatile memory space, and data of any one of the zones that have not been modified within a predetermined time interval are committed by the change counter to the first non-volatile memory space.

A technical effect of the invention is that a solid-state mass storage device containing a first non-volatile memory space can be further provided with a second non-volatile memory space and optionally a volatile memory space that is/are capable of functioning as a low-pass filter for the storage device by storing data that are subject to modification prior to the data being committed to the first non-volatile memory space.

Other aspects and advantages of the invention will be better appreciated from the following detailed description.

DETAILED DESCRIPTION OF THE INVENTION

Figure 1:
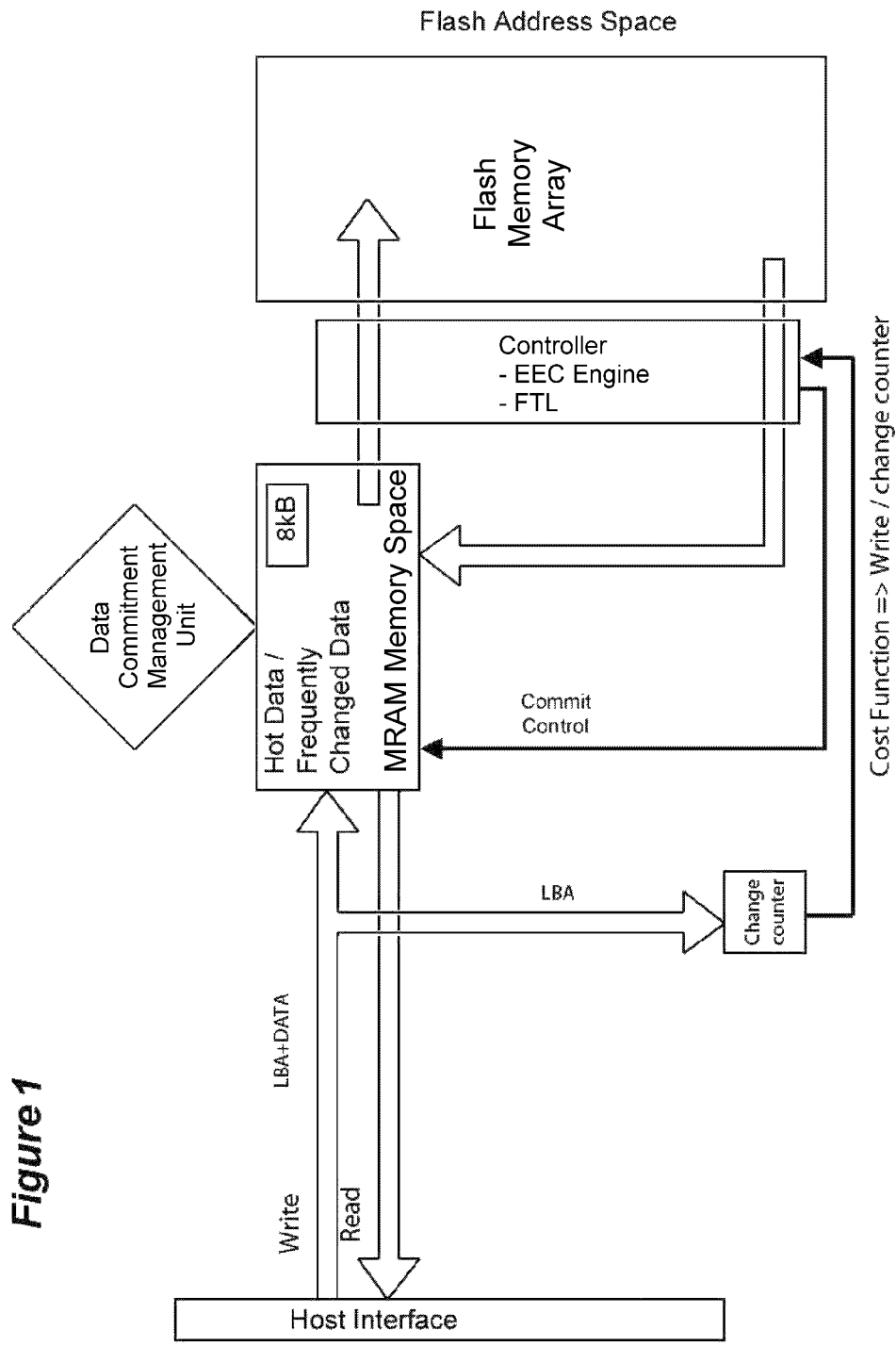
FIG. 1 shows a functional diagram of a solid state drive having a non-volatile memory space defined by a flash memory array and a second non-volatile (MRAM-based) memory space that serves as a low-pass filter for host writes to the flash memory array.

The present invention provides mass storage devices, for example, a solid state drive (SSD), that utilize more than one type of non-volatile memory component to define a non-volatile memory space of the device. The non-volatile memory space includes first (main) and second non-volatile memory spaces. One or more first non-volatile memory components define the first non-volatile memory space, while the second non-volatile memory space is defined by at least a second non-volatile memory component that has a higher write endurance than the first non-volatile memory components. The first non-volatile memory components are preferably an array of flash memory components, more preferably a NAND flash memory array. The second non-volatile memory component(s) may be, for example, MRAM, FRAM, or another suitable non-volatile memory technology capable of exhibiting a higher write endurance than NAND flash memory components. As will be discussed below, the second non-volatile memory space functions as a low pass filter for all host writes to the first non-volatile memory space.

Decreasing write endurance, as a side effect of the migration to smaller process geometries, is one of the biggest challenges of current NAND flash-based solid state drives. Whereas 65 nm single-level cell (SLC) NAND flash are able to undergo approximately 100,000 program and erase (P/E) cycles, multi-level cell (MLC) NAND flash at the 2× nm process node can show significant wear after far fewer P/E cycles, for example, 1,000 P/E cycles. Though wear leveling is capable of evenly distributing the programming load over all memory blocks within a flash memory array of a storage device, with the result that it reduces peak accumulations of writes and, thereby, reduces spot fatigue of individual blocks within the array, it can only marginally counteract the impact of inherent reduced endurance of the memory cells of the array.

Among the issues contributing to potentially excessive wear of NAND flash memory components is a phenomenon known as write amplification. Write amplification or write amplification factor (WAF) is the ratio between data written by a host (e.g., a computer system) to the mass storage device and the actual amount of data written to the memory components. Several factors contribute to the WAF, such as the mismatch between the physical page size as a minimally programmable unit and any given unit of data written by the host to the storage device. For example, if the host writes a single "sector" of 512 bytes to the storage device, the device must still program an entire page of typically 8 kB. In dual plane architectures where pages of two planes are accessed in tandem in order to increase the performance of the array, the same 512 byte host write may even cause programming of 16 kB NAND flash storage. In this case, the WAF is 16 kB/0.5 kB, or a ratio of 32. Arguably, though an extreme case, a WAF of 10 or higher is not unusual. Such an inflated write activity is highly undesirable, particularly if the storage device uses NAND flash memory components with a write endurance of 1,000 cycles. Likewise, every time data are written to the storage device, the device must also update the metadata, that is, the data about the data including the logical to physical address mapping done by the flash translation layer (FTL) associated with the memory controller of the storage device. This again leads to a situation where a minuscule change in the address table requires a minimum of a full physical page (or logically combined two pages in dual plane mode).

It is possible and standard procedure to buffer data in a write-combine buffer, typically comprising a volatile DRAM or SRAM memory component. In this manner, small chunks of data can be consolidated before they are written to a non-volatile flash memory array. Even so, each independent piece of data will occupy a "sector" of 4 kB within a NAND page. This type of sub-page management optimization through write combining is geared to reduce unnecessary writes of "dummy data" to underutilized pages. However, because of the volatile nature of DRAM and SRAM buffer memories, life of data within those intermittent buffers needs to be restricted to sub-second time intervals before the buffer is purged to the non-volatile NAND flash memory components. This is necessary because otherwise, in case of a power failure, the most recent set of data (along with any update of the metadata) would be lost.

In many ways, the operation of a NAND flash-based solid state drive in any host computer system (for example, a standard personal computer or server environment) can be described as highly inefficient, since the drive is subjected to small writes at high frequencies and yet very poor utilization of the actual memory capacity of its NAND flash memory components. On the other hand, if the write efficiency could be increased to eliminate or at least greatly reduce the ratio between dummy writes and actual data stored on a NAND flash memory component, the effective endurance of the entire solid state drive would increase proportional to the reduction in WAF.

Historically, NAND flash memory components have been the only practical non-volatile memory technology available in capacities suitable for mass storage of data. Battery-backed SRAM, FRAM, and other competing non-volatile memory technologies capable of exhibiting a higher write endurance than NAND flash memory components have largely been either unattractive because of the power budget or because of cost and footprint. However, some recent advances in MRAM technology are holding promise for higher capacity along with improved energy efficiency. With respect to cost, MRAM memory components are still orders of magnitude behind, for example, DRAM. At the same time, commercial MRAM solutions are becoming available that have an interface complying with SDRAM interface standards, for example, the same pin-out including command, address and data signals as DDR3 SDRAM, thereby enabling easy implementation of low capacity MRAM partitions in a DDR3 memory address space. Consequently, the following discussion will make reference to the use of MRAM memory, though it should be understood that the scope of the invention is intended to encompass other non-volatile memory technologies capable of exhibiting high write endurances, particularly if higher than NAND flash memory components.

As noted above, a first aspect of the invention is to provide a solid-state mass storage device with a low-pass filter that utilizes non-volatile memory technology capable of exhibiting a higher write endurance than NAND flash memory components. As a preferred example, such a storage device uses non-volatile memory technology, optionally in combination with a volatile memory component, for example, DDR3 DRAM, as a tier of the storage device that functions as the low-pass filter. As used herein, "low-pass" means that the filter absorbs most of the frequent read and write accesses to the storage device. The non-volatile memory space of the mass storage device includes the aforementioned main (first) non-volatile memory space, which can make use of an array of more conventional NAND flash memory components. The non-volatile memory technology of the low-pass filter preferably makes use of one or more MRAM components (or other high-endurance non-volatile memory technology) to define the aforementioned second non-volatile memory space of the storage device.

FIG. 1 schematically represents a first non-limiting example of the invention as a flash memory-based SSD having an 8 or 16 MByte (64 Mbit of 128 Mbit) MRAM memory space as a low pass filter for writes to a separate flash memory space on the SSD, which as previously noted is defined by an array of flash memory components, preferably NAND flash memory components. In the embodiment of FIG. 1, all host writes ("Writes" in FIG. 1) are initially committed to the MRAM memory space. Since MRAM memory is non-volatile, it is not necessary to flush the data to the flash memory space within a short period of time. Instead, data can be collected, logically reordered, and consolidated in the MRAM memory space and then written to the flash memory space in an efficient manner. In preferred embodiments, data are always moved from the MRAM memory space to the flash memory space in blocks corresponding to a block of flash memory space in order to minimize multiple accesses to the same physical flash memory block, thereby avoiding near-field effects contributing to write disturb problems that can corrupt existing data.

Figure 2:
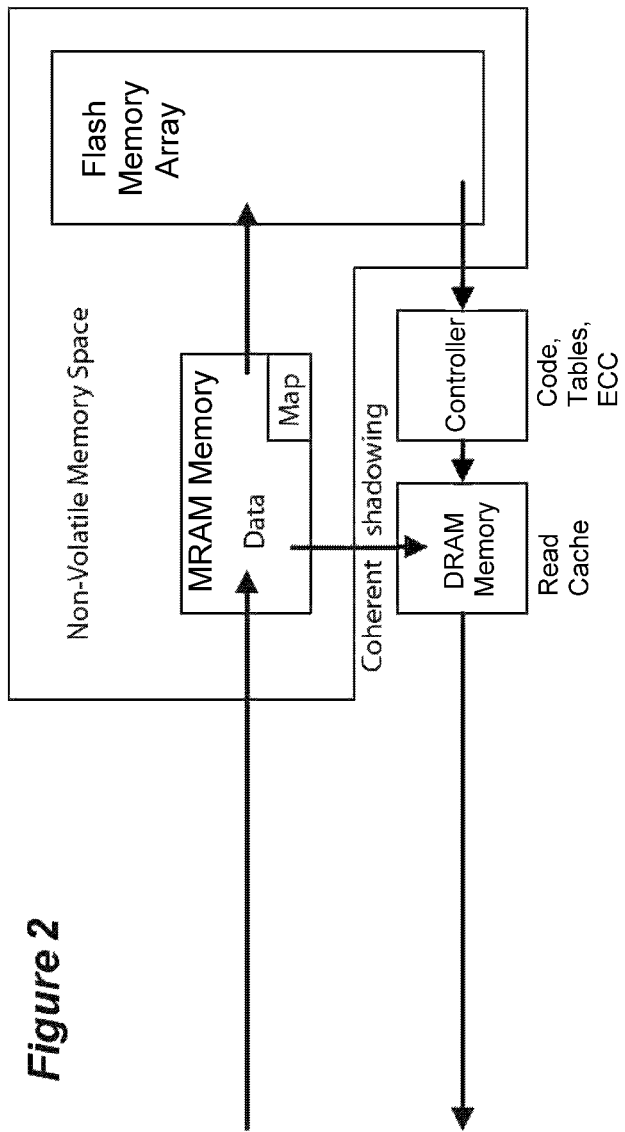
FIG. 2 shows a schematic implementation of the solid state drive of FIG. 1 that further includes a volatile memory space defined by a DRAM memory cache on the drive.

MRAM components used as the second non-volatile memory space of the SSD preferably have a very low error rate, which allows for the use of simple error checking and correction (ECC) algorithms based on parity calculations, such as Hamming code, which do not require more complex calculations as those used by more advanced ECC techniques such as Bose-Ray-Chaudhuri-Hocquenghem (BCH) or low density parity check (LDPC). This aspect can greatly reduce the load on the memory controller (FIGS. 1 and 2) of the SSD and increase the host write speed to the SSD. The ECC or parity data can be stored on the MRAM memory, on the optional volatile memory (DRAM) component (FIG. 2), or on both. The memory controller (for example, a chipset or a monolithic integrated circuit) of the SSD controls access to the first and second non-volatile memory spaces, performs logical to physical address translation for each type of memory, and generates redundancy information specific for each type of memory.

In addition to the actual host writes, the data map, that is the metadata of all data stored in the flash memory space can be stored in the MRAM memory space. Since the metadata need to be updated every time new data are committed to the flash memory array or as soon as data are moved during garbage collection or refresh caused by increased bit error rates detected during surface scrubbing, those maps or indices are frequently rewritten. While the updated information typically only comprises small changes, the properties of NAND flash memory components still require rewriting of at least a full logical page. In contrast, MRAM memory components allow overwriting of existing data without requiring a preceding erase cycle, thereby facilitating the update of metadata at extremely low write cost.

Embodiments of SSDs represented in FIGS. 2 through 5 further have a volatile memory space defined by a volatile memory component, preferably a DRAM memory component ("DRAM memory"), which can be utilized as a volatile read cache for the SSD. The DRAM memory preferably may have a greater memory capacity than the MRAM memory space and conforms to the same generation of DDR SDRAM as that used by the MRAM protocol in order to ease integration of the two memory technologies and management of data between the volatile DRAM memory components and the non-volatile MRAM memory components. In these embodiments, the controller preferably generates redundancy information specific for each type of memory (non-volatile and volatile), and redundancy information of data written by the host computer system to the SSD may be written to the MRAM and/or DRAM memory space.

Figure 3:
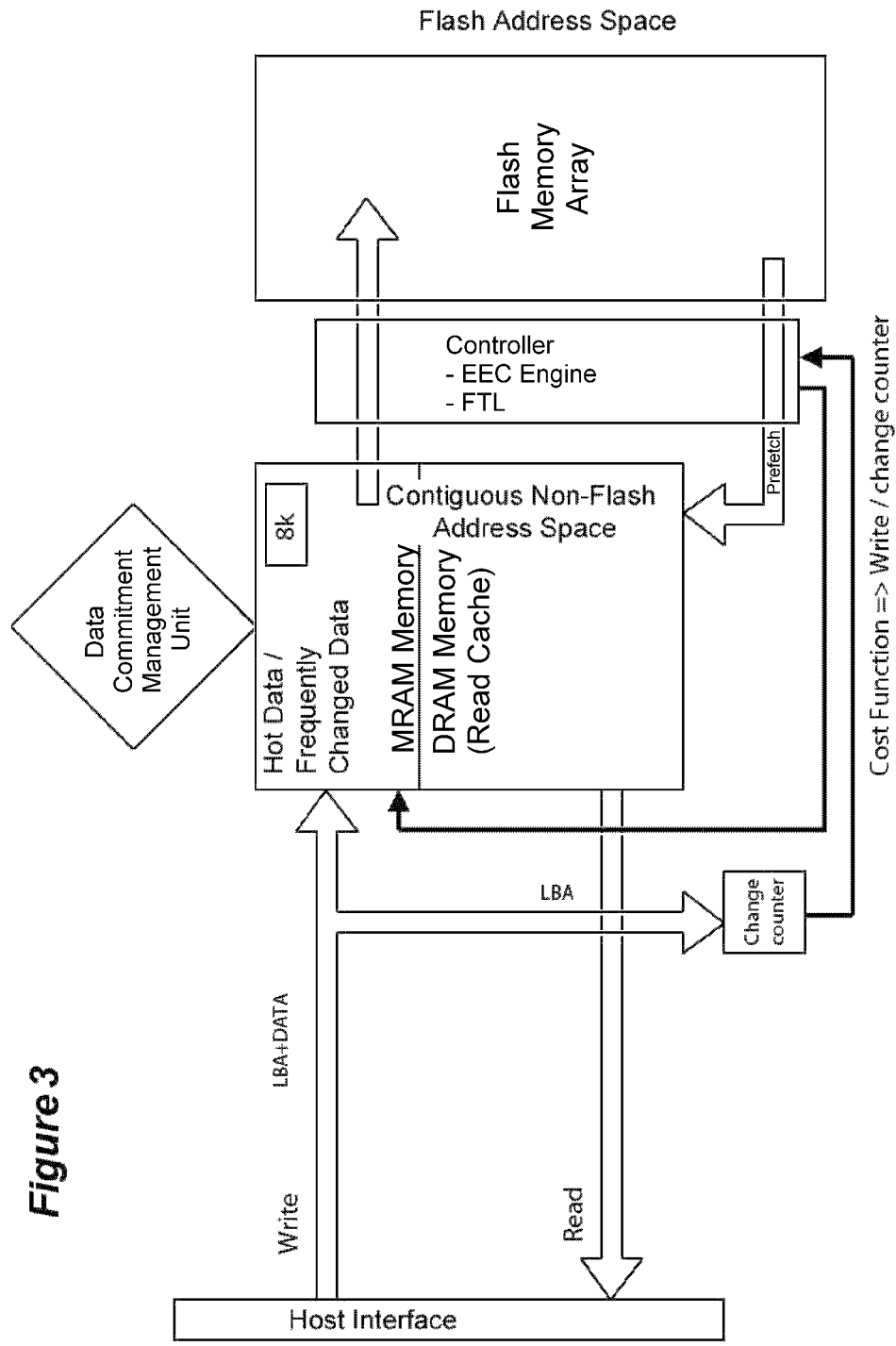
FIG. 3 represents a variation of the device of FIG. 2, wherein the non-volatile MRAM-based memory space and the volatile DRAM memory-based space define a contiguous address space partitioned into volatile and non-volatile address spaces to buffer host reads and writes, respectively.

In an embodiment illustrated in FIG. 3, the second non-volatile memory space of the SSD ("MRAM memory") comprises DDR3-compatible MRAM memory components, and is an address extension of the DRAM memory, for example, a DDR3 SDRAM component, used as the volatile read cache for the SSD. In this configuration, a host computer system (host) can read data prefetched from the flash memory array into the DRAM memory, and can also read data directly from the DDR3-compatible MRAM memory. As such, data can be accessed directly by the host from the MRAM memory space of the SSD before they are committed to the flash memory array. Hence, data can be written to the SSD as intermittent or preliminary data stored on the MRAM memory and updated on the fly without wasting endurance of the flash memory array by adding P/E cycles. This strategy also saves volatile DRAM memory space.

Figure 4:
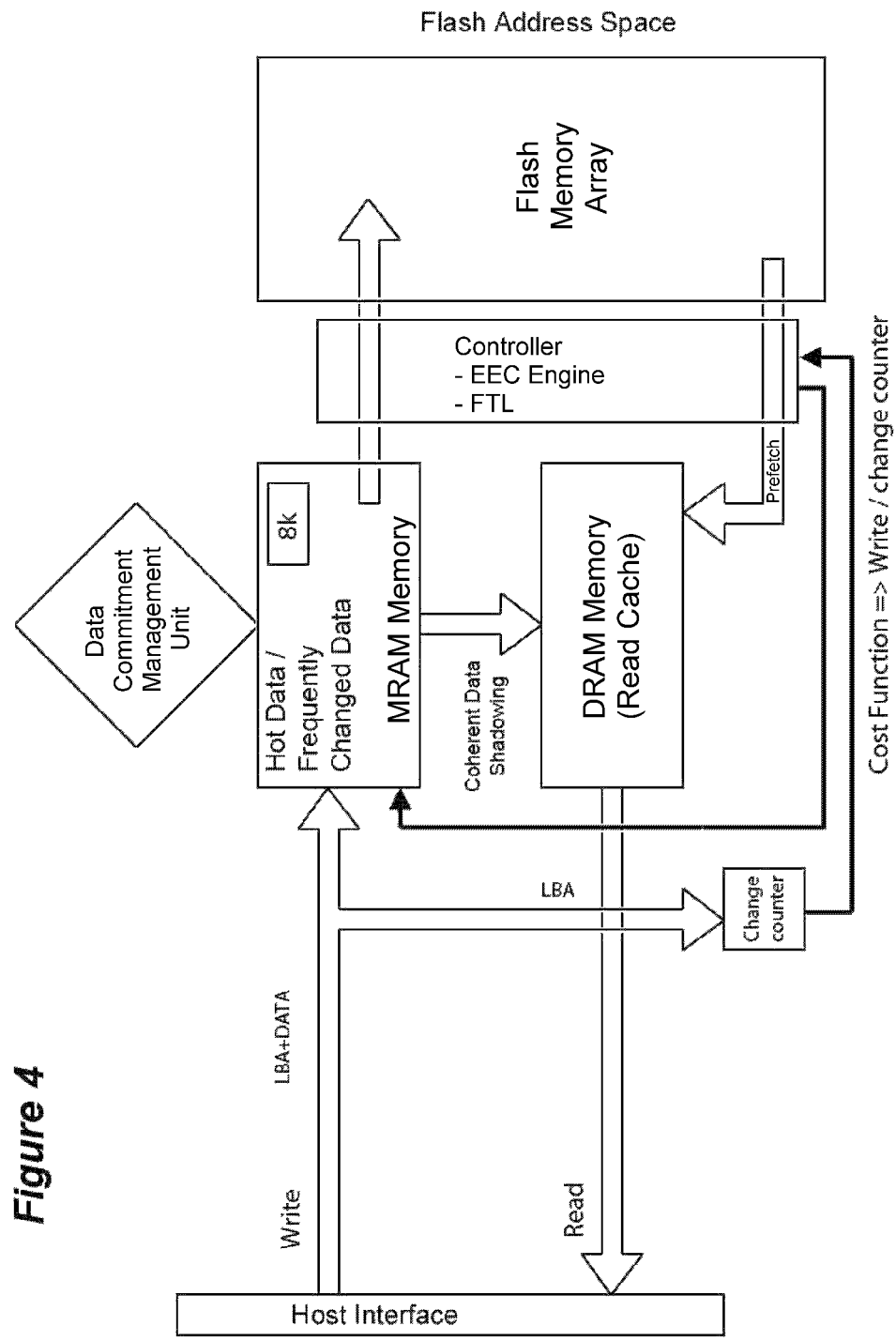
FIG. 4 shows details of an embodiment of the device of FIG. 2, including a host interface and a change counter to determine the age of data in the MRAM-based memory space along with coherent shadowing of data in the DRAM memory-based space.
Figure 6:
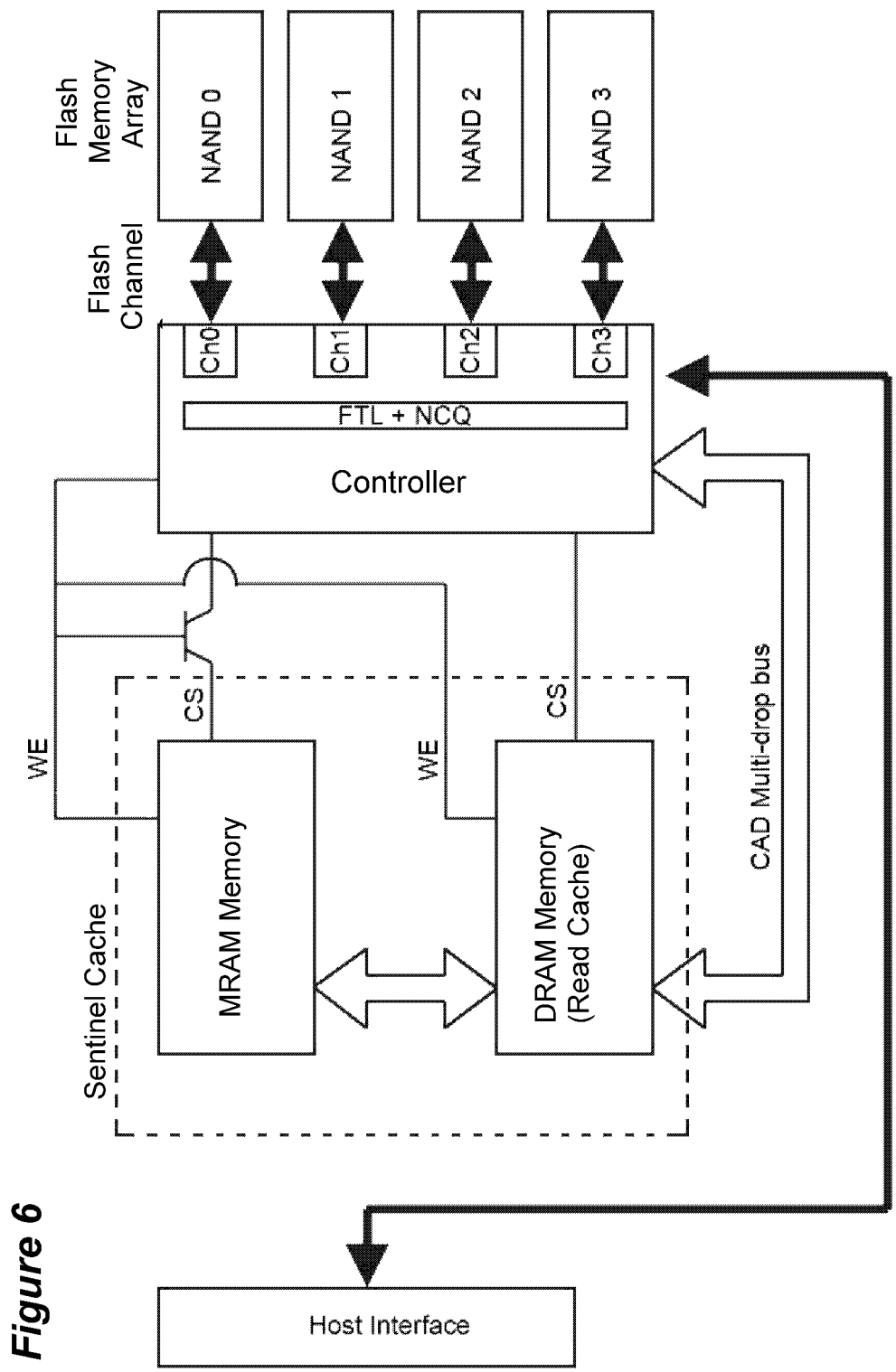
FIG. 6 shows a possible circuit diagram of an embodiment of the invention that uses a write enable signal to enable a chip select signal to pass through to the MRAM-based memory space on a write access and disable the chip select signal on a read access.

A trade-off of the above-discussed strategy is the possibility for contention if data are read by the host simultaneously with another read access to the MRAM memory by the controller in order to move cold data to the flash memory array. While this may not be an imminent problem, this type of contention or race condition can be completely avoided by shadowing all host writes to the MRAM memory to a DRAM memory as shown in FIG. 4. All data written by the host to the non-volatile MRAM memory are duplicated into the volatile DRAM memory functioning as a read cache, and any read request by the host accesses the data from the DRAM memory. A relatively simple implementation of this configuration is to place both MRAM and DRAM components on a shared multi-drop bus for command, address, and data (CAD) signals and selectively enable the target device using assertion of the chip select (CS) signal, as represented in FIG. 6. The chip select signal, in turn can be enabled or disconnected on a per memory component level by adding an in-line transistor under the control of the write-enable (WE) signal. For example, on a host write, the write-enable signal is asserted (pulled low) to turn on both chip select signals to a logical true value, whereas on a host read or prefetch only the DRAM chip select signal is allowed to pass. In the simplified version illustrated in FIG. 6, pulling the write-enable signal high (for a logical false) during a read access can be used to switch a transistor in the CS signal path to the MRAM memory to the open state, thereby interrupting assertion of the CS signal. Consequently, the MRAM memory will not decode the address and command signals and not output any data on the bus.

Alternatively, the chip select signals can be asserted by the memory controller. For example, access of the (typically) smaller MRAM on a host read of prefetched data from the non-volatile flash memory array can be excluded by mapping the address space for host reads from the DRAM memory to a memory range outside the address range of the MRAM memory.

Another implementation can involve a dual channel memory controller with one channel connected to the MRAM memory component(s) and the other channel connected to the DRAM memory component(s) for completely independent interfacing of the memory controllers with each of the memory spaces.

Since all data in the DRAM memory are copies of data stored in the non-volatile MRAM memory, the SSD is immune against power failure. Moreover, I/O contention of the MRAM data bus is minimized since host reads directly access the DRAM memory, meaning they use a different bus than data movement to the flash memory array.

In addition to using the MRAM and DRAM memory spaces as complements for actual data, it may be advantageous to use the DRAM memory to store parity data of the MRAM ECC protection. Before committing the data to the flash memory array, the data integrity of the MRAM memory-based data can be verified by either comparing them against the latest shadowed copy in the DRAM memory or against the DRAM memory-based parity data.

MRAM memory, like other non-flash-based non-volatile memory technologies, is currently very expensive. Therefore, a relatively low capacity of MRAM memory may be preferred for use in the SSD to avoid exceeding a tolerable cost level, in which case implementation preferably makes use of intelligent management of the resources of the MRAM memory. For example, FIGS. 1, 3, and 4 (and also FIG. 5) represent the use of a data commitment management unit that interfaces with the MRAM memory and governs the commitment of cold low-update frequency data stored on the MRAM memory to the flash memory array. The management unit can be part of the memory controller of the SSD. All host writes are initially stored in the MRAM memory in order to reduce access frequency of the flash memory array, yet MRAM memory capacity only becomes available by moving data to the flash memory array. One strategy to minimize transfer of data that might be updated is to gauge their "temperature" depending on the access and modification of the same data. This can be done by implementing a change counter (FIGS. 1, 3, 4, and 5) that receives the logical block address (LBA) of the data written to the SSD and tracks whether data have been recently accessed and are therefore "hot" or whether the last access dates back far enough to allow the reasonable assumption that the data have "cooled off." In the latter case, the management unit commits the "cold" data to the flash memory array based on information provided by the change counter, with reduced risk of having to immediately change the cold data after it has been committed to the flash memory array.

The change counter preferably determines whether data are hot or cold by keeping track of the access frequency of data stored in the MRAM memory space and then "devaluating" the data from "hot" to "cold" by a preset time function or a dynamic function. For example, the write frequency from the host computer system to the SSD can be used to determine an appropriate devaluation algorithm. In a particular example, data can be devaluated from a hot status to a cold status depending on the last change of data within individual zones of the MRAM memory space, and a zone containing data that haven't changed during a predetermined interval are committed to the flash memory array while zones containing data that have changed during the predetermined interval are maintained in the MRAM memory space. The predetermined interval can be defined as a simple time function or a complex algorithm taking into account the write activity of the SSD. The predetermined interval can also be defined as a simple time function or a complex algorithm taking into account the level of utilization of the MRAM memory space. For example, commitment of data from the MRAM memory space to the flash memory array can be scheduled when the MRAM memory space becomes full or reaches a certain threshold (for example, 90% utilization of its memory space) according to a time function for devaluation of the data from hot to cold or a dynamic function based on a fraction of the data stored in the MRAM memory space in combination with a write frequency counter. For example, commitment can follow a rule that 10% (or any other predetermined fraction) of the MRAM memory space is always free. After reaching a devaluation threshold, the data are written to the flash memory array in chunks corresponding to an accessible page (possibly comprising a plurality of physical pages) or else corresponding to a flash block.

Maintaining the change counter for each address in the MRAM memory space can be done, though doing so may be costly with respect to resources needed, especially with increasing MRAM capacity. Moreover, host writes typically occur in multiples of 4 kB chunks (regardless of whether the actual data are less), thereby eliminating the need to track every address. In most cases, even in a random access pattern, multiple 4 kB file system allocation units are written to the device within a very short period of time. This lends to the possibility of dividing the MRAM address space into several zones, wherein all addresses within a zone share the same counter. For example, the address space can be divided into zones of 256 kB each. The capacity (size) of the zones (the granularity of changes) can be set by the resources available in the system (i.e., memory resources to store the counters) or defined according to the block size of the flash memory components used. For example, each zone can have a capacity of an integer value of a logical page of the flash memory array. Matching the size of the zones with the block size of the flash memory array greatly increases the write efficiency in that an entire block can be programmed in a single access, whereby all access latencies beyond the initial access latencies are masked.

Individual files or fragments thereof can be moved from an older zone to a newer zone if they are modified. Alternatively, a policy can be implemented wherein the charge counter of the entire zone is reset if any data therein are changed. Implementation of either policy may be done on device initialization or on the fly through a standard user interface, depending on the specific environment or workload.

Given the relatively high cost of MRAM compared to SDRAM, it will typically be desirable to store the charge counter for the zones of the MRAM address space in the DRAM memory space, in which case the address space of the DRAM memory space is also preferably configured into zones corresponding to the zones in the MRAM memory space. This solution is especially attractive since the counter does not need to maintain information during power-down situations and, therefore, any volatile memory solution would suffice. As soon as the storage device is powered up, regardless of whether this is during host system initialization or after hot-plugging, the change counters can be established through a firmware routine in the volatile DRAM memory space and activated as soon as the host starts writing data to the storage device.

As previously noted, the change counter stored in the MRAM and/or DRAM memory spaces can abide by a number of different rules. The simplest case is to use a timer and devaluate or "cool" any data by a certain percentage at fixed or variable time intervals. Instead of associating the devaluation to the actual data, the change counter can be used to generate a change index associated with each zone that decreases if data within a given zone are not modified during the time interval to result in a devaluation of the data and a lower change index associated with the zone containing the data. The change index may remain the same or increase if data within the zone are modified during the time interval. In this manner, data that are fully devaluated or reach a threshold value on the basis of their change index can be identified as cold and moved from the MRAM memory to the flash memory array. The time intervals may be predetermined and fixed and devaluation may be a linear function, for example, on a per second or per minute basis. As a particular example, the change index for a given amount of data can be devaluated (or cooled) by 1% per unit time interval, for example, per second, meaning that after 100 seconds the change index is reduced by 100% and the data are determined to have completely cooled off and can be committed to the flash memory array. Alternatively, a logarithmic or any other non-linear mathematical function can be tied to the counter, allowing the size of the time interval to increase or decrease over time. For example, an accelerated charge counter can start at a 10 second interval and then finish at 1 second intervals, or vice versa, a decelerated counter can start at 1 second intervals and finish at 10 second intervals. The specific application or typical environment of deployment of the SSD may prompt the selection of one strategy over the others. The change counter can generate a change index that is associated with each zone, and use the availability of the zones to dynamically change the speed of devaluation of the zones.

A somewhat different approach is to use the host write frequency as a timer in combination with the actual data bandwidth coming in from the host. That is, if the host writes more data to the SSD, then the cooling of data will be accelerated, if less data are written by the host, then the data in the MRAM memory remain hot longer. This strategy accommodates user-induced idle periods as well as computationally intensive processes in which the host needs more time to update a given data set.

A relatively simple implementation of the strategy discussed above is to establish different "temperature zones" over the capacity of the MRAM memory space, for example, using ten steps of cooling off, ordered hierarchically based on the time stamp of the writes. Data in the coldest zone can be purged to the flash memory array after performing ECC encoding and optional encryption. The freed-up capacity can then receive any new host writes. In addition, it may be advantageous to reserve a buffer, meaning that the full capacity of the MRAM memory is never used except in "overflow" situations. Data in the process of cooling off are heated again with any recurrent modification or change.

In general, the commitment of data from the MRAM memory space to the flash memory array can follow similar strategies and mechanisms as what is known in the art for committing data from a volatile memory cache to a flash memory array, with the exception that there is no immediate urgency based on a risk of losing data in the case of a power failure. As discussed previously, the most efficient way of writing data to the flash memory array is to write an entire block at a time. According to this strategy, an optimal definition of zones would be to match the zone size to the block size of the flash memory components. Alternatively, a plurality of flash pages can be defined as the threshold for committing data to the flash memory array. An initial commitment of data to the flash memory array can be triggered by several factors, for example, a simple age function or a threshold based on the extent to which the MRAM memory space is filled. If either specified parameter is met, the data are read from the MRAM memory into the controller where additional ECC encoding is done according to the requirements of the flash memory components used (e.g., NAND). Subsequently, the data are deployed to the next available flash channel and written to the flash memory array. Additional manipulations, such as encryption of the data stream or addition of a second level of ECC, for example, distributed parity over several flash memory components, can further be added to increase reliability of the storage device.

Figure 5:
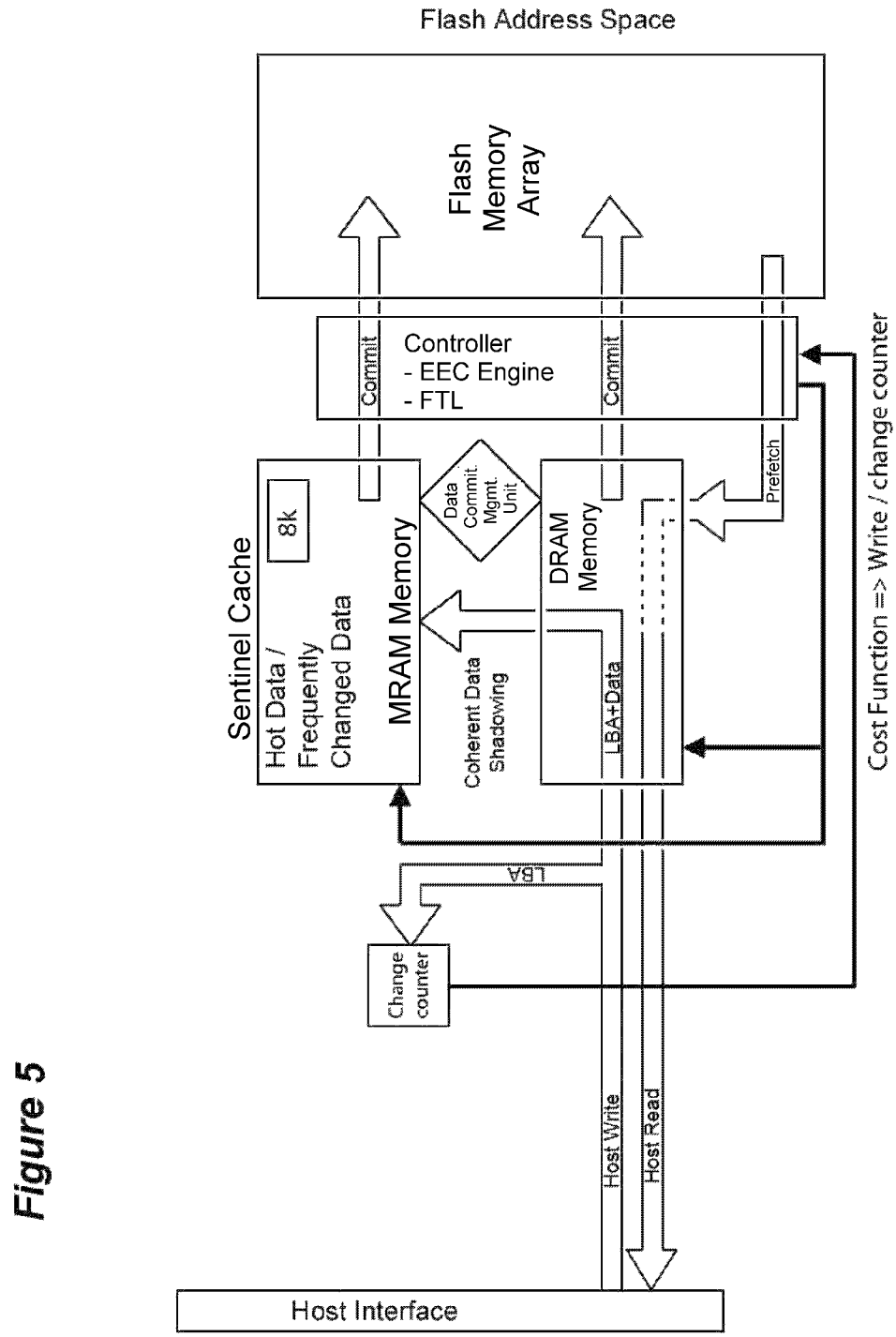
FIG. 5 shows another embodiment of the device of FIG. 2, wherein all host accesses go to the DRAM memory-based space and data written by the host are shadowed into the MRAM-based memory space, and wherein there are multiple commit pathways from the DRAM memory-based space and the MRAM-based memory space to the flash memory array.

Referring now to FIG. 5, a conceptually slightly different approach is to use the volatile DRAM memory space for all host accesses, regardless of whether it is prefetching of reads or low-pass filtering of writes. However, all host writes are mirrored to the MRAM memory space, which constitutes a silent back-up memory referred to herein as a sentinel memory. Within the volatile DRAM memory space an address space is mapped to the address space of the sentinel memory. Both address spaces are substantially identically divided into zones that are monitored using the change counter and have the same change index associated with corresponding zones. Either address space can function as the reference address space for commitment of data to the flash memory array by evaluating the change frequency of data stored in each zone, and using the change index as indicator. All data committed to permanent storage on the SSD are transferred from the DRAM memory space to the flash memory array, and the corresponding addresses in each of the sentinel memory and DRAM memory space are subsequently invalidated. A simple timer or more complex algorithms as discussed above to determine a devaluation of data within the zones can be used.

With respect to management of the volatile DRAM memory and the non-volatile sentinel memory, all host accesses are directed to the DRAM memory, regardless of whether it is write or read, which greatly simplifies the signal routing and control. However, the address space in the volatile DRAM memory allowed for host writes is limited to mirror that of the non-volatile sentinel memory, and data are written simultaneously to the DRAM and sentinel memory.

Address, data and commands are shared between the DRAM and MRAM memory to simplify trace routing and all data are written to the same addresses on the DRAM and sentinel memory by broadcasting them over the same bus and asserting the chip-select (CS) signal to turn on the receivers on both parts to enable command and address decoding.

In the case of a read access, it is necessary to avoid data contention of the shared bus, which can be accomplished by using a logical false of the Write Enable signal to turn off a gate in the chip-enable path to the sentinel memory. Consequently only the DRAM outputs data onto the bus. Since no data are changed or updated, it is not necessary to access the sentinel memory anyway. This way, the controller does not need to know whether it is a host read or a commit read from the cache.

Upon power loss or power down, the volatile DRAM memory loses all data. Therefore, in the case of initialization of the storage device upon boot-up or after power failure, data are read directly from the MRAM memory and mirrored into the DRAM memory while generating redundancy information on the fly. This can be done by differentially asserting the CS signal like in any other multi-bank memory. The ECC data lines bypass the sentinel memory and are only connected to I/O pins on the DRAM memory, whereby the same organization of zones is preserved. In addition, the metadata may be shadowed to the volatile Dram memory. Generating and storing redundancy information in the DRAM memory space is an optional feature that may become redundant if an additional CRC engine is incorporated in the DRAM memory space.

While the invention has been described in terms of specific embodiments, it is apparent that other forms could be adopted by one skilled in the art. For example, in addition to MRAM or FRAM memory components, other non-volatile memory components with high write endurance could be used in the context of the invention. Therefore, the scope of the invention is to be limited only by the following claims.

The invention claimed is:

1. A solid-state mass storage device comprising:
    a host interface for interfacing the mass storage device with a host computer system;
    an array of flash memory components organized into memory blocks and logical pages and defining a first non-volatile memory space;
    a second non-volatile memory space defined by at least a second non-volatile memory component, the second non-volatile memory component having a higher endurance compared to the array of flash memory components, the second non-volatile memory component being adapted to allow overwriting of existing data stored therein without requiring a preceding erase cycle, the second non-volatile memory space being configured into zones, each of the zones having a capacity that is an integer value of the size of the logical pages of the flash memory components;
    a volatile memory space utilized as cache by the mass storage device, the volatile memory space having at least first and second address spaces, the first address space being configured into zones corresponding to the zones of the second non-volatile memory space, each of the zones of the volatile memory space having a capacity that is an integer value of the size of the logical pages of the flash memory components, the mass storage device writing all data written to the mass storage device by the host computer system to the zones of the volatile memory space and the volatile memory space mirroring the data in the zones of the second non-volatile memory space;
    a memory controller adapted to access the first and second non-volatile memory spaces and the volatile memory space, perform logical to physical address translation therefor, and generate redundancy information specific thereto; and
    a change counter adapted to monitor change of data within each of the zones of the first and second non-volatile memory spaces and establish a change index for each of the zones of the first and second non-volatile memory spaces, the change index being stored in the second address space of the volatile memory space, the change index associated with any zone of the first and second non-volatile memory spaces decreasing according to a predetermined function if the data within the zone are not modified, the data within the zone being committed to the first non-volatile memory space if the change index of the zone reaches a predetermined threshold.

2. The solid-state mass storage device of claim 1, wherein the change index decreases according to the predetermined function if the data within the zone associated therewith are not modified during a time interval.

3. The solid-state mass storage device of claim 1, wherein the predetermined function of the change counter is a percentage of utilization of the zones in the second non-volatile memory space.

4. The solid-state mass storage device of claim 1, wherein the redundancy information of the data written by the host computer system to the mass storage device is written only to the volatile memory space.

5. A method for increasing the write endurance of a flash-based solid-state mass storage device operating with a host computer system, the method comprising:
    providing a first non-volatile memory space comprising flash memory components organized into logical pages and logical blocks;
    writing all data written by the host computer system to the mass storage device in a low pass filter comprising a second non-volatile memory space;
    dividing a first address space of the second non-volatile memory space into zones of predetermined size;
    monitoring recurrent writes of the data stored in the zones at a logical block address with a change counter;
    generating with the change counter change indices that are individually associated with each of the zones, the change index of any one of the zones increasing upon modification of the data within the zone and decreasing if the data within the zone are not changed; and maintaining data with a higher change index in the second non-volatile memory space and committing data with a lower change index to the first non-volatile memory space.

6. The method of claim 5, wherein the change indices decrease by a predetermined fixed interval time function.

7. The method of claim 5, wherein the change indices decrease as a non-linear time function.

8. The method of claim 5, wherein the change indices decrease as a function of utilization of the second non-volatile memory space.

9. The method of claim 5, wherein metadata of the data stored on the mass storage device are stored in the second non-volatile memory space.

10. The method of claim 5, further comprising:
dividing an address space of a volatile memory space into zones;
mirroring all of the data written by the host computer system to the mass storage device in the zones of the volatile and second non-volatile memory spaces; and
storing in the volatile memory space redundancy values of the data written to the zones of the volatile and second non-volatile memory spaces.

11. The method of claim 10, wherein all read accesses by the host computer system access the data in the volatile memory space.

12. The method of claim 11, wherein all data committed to permanent storage on the mass storage device are transferred from the volatile memory space to the first non-volatile memory space and corresponding addresses in both of the volatile memory space and the second non-volatile memory space are subsequently invalidated.

13. The method of claim 11, wherein upon initialization of the mass storage device, contents of the second non-volatile memory space are mirrored into the volatile memory space.

14. A solid-state mass storage device adapted for use with a host computer system, the mass storage device comprising:
a host interface;
a memory controller;
at least a first non-volatile memory space defined by at least a first non-volatile memory component organized into memory blocks and pages; and
a second non-volatile memory space defined by at least a second non-volatile memory component having a higher endurance compared to the first non-volatile memory component and having capacity to store data corresponding to at least a plurality of the memory blocks of the first non-volatile memory component, the second non-volatile memory space being configured into zones wherein each zone has a capacity of a plurality of the pages of the first non-volatile memory component, the second non-volatile memory space being configured to receive data written by the host computer system to the mass storage device and store the data within the zones thereof; and
a change counter that determines a change frequency of the data stored within the zones of the second non-volatile memory space to identify the data thereof as lower or higher change frequency data, the data of any of the zones identified as the lower change frequency data being committed to the first non-volatile memory space, and the data of any of the zones identified as the higher frequency data being maintained in the second non-volatile memory space,
wherein the change counter determines the change frequency of the data stored within the zones of the second non-volatile memory space according to a time interval, the change counter generates change indices associated with the zones, the change index associated with one of the zones decreases if the data within the zone are not modified during the time interval, and the change counter uses the change index to determine whether the data within the zone are identified as the lower change frequency data and committed to the first non-volatile memory space.

15. The solid-state mass storage device of claim 14, the mass storage device further comprising a management unit that governs the commitment of the lower change frequency data to the first non-volatile memory space.

16. The solid-state mass storage device of claim 14, wherein error checking and correction information of the data written to the second non-volatile memory space are stored in the first and second non-volatile memory spaces.

17. The solid-state mass storage device of claim 14, wherein information of the change counter are stored in the second non-volatile memory space.

18. The solid-state mass storage device of claim 14, wherein the second non-volatile memory component is an MRAM memory component having an interface complying with an SDRAM interface standard.

19. The solid-state mass storage device of claim 14, further comprising a volatile memory-based cache that performs coherent shadowing of the higher frequency data maintained in the second non-volatile memory space.

20. The solid-state mass storage device of claim 14, wherein the time interval is a predetermined fixed time interval.

21. The solid-state mass storage device of claim 14, wherein the time interval is an accelerated or decelerated time interval.

22. The solid-state mass storage device of claim 14, wherein the change counter uses the availability of the zones to dynamically change rates at which the change indices are decreased.

23. The solid-state mass storage device of claim 14, wherein the capacity of each of the zones is an integer value of a logical page of the first non-volatile memory component.

24. The solid-state mass storage device of claim 14, wherein the data of the zones identified as the lower change frequency data and committed to the first non-volatile memory space are contained in a plurality of the zones that correspond to a block within the first non-volatile memory space.

25. The solid-state mass storage device of claim 14, wherein metadata of the lower change frequency data committed to the first non-volatile memory space are stored in the second non-volatile memory space.

26. The solid-state mass storage device of claim 14, further comprising a volatile memory-based cache that performs prefetching of data to be subsequently read by the host computer system.

27. The solid-state mass storage device of claim 26, the volatile memory-based cache storing error checking and correction information of the data written to the second non-volatile memory space and storing change counter information of the zones of the second non-volatile memory space.

28. A low-pass filter for reducing host writes by a host computer system to first non-volatile memory components that define a first non-volatile memory space of a solid-state mass storage device, the low-pass filter comprising:

a second non-volatile memory space defined by at least a second non-volatile memory component that has a higher endurance compared to the first non-volatile memory components, the second non-volatile memory space being adapted as a write cache for the first non-volatile memory space, the second non-volatile memory space being configured into zones; and a change counter that monitors changes of data stored in each of the zones of the second non-volatile memory space, the change counter committing to the first non-volatile memory space the data of any one of the zones that have not been modified within a predetermined time interval.

29. The low-pass filter of claim 28, wherein the change counter generates change indices that are individually associated with each of the zones of the second non-volatile memory space, the change index of any one of the zones increases upon modification of the data within the zone and decreases if the data within the zone are not changed, and the low-pass filter maintains the data having a higher change index in the second non-volatile memory space and commits the data with a lower change index to the first non-volatile memory space.

30. The low-pass filter of claim 28, wherein all metadata of the mass storage device are stored in the second non-volatile memory space.

31. The low-pass filter of claim 30, further comprising a volatile memory space that is complementary in size to the second non-volatile memory space, the low-pass filter operating to mirror all of the data from the second non-volatile memory space to the volatile memory space.

32. The low-pass filter of claim 31, wherein redundancy information of the data written by the host computer system to the mass storage device is written to the volatile memory space.

* * * * *